(No Model.)
E. R. PROCTER.
DOUBLETREE.
No. 347,826. Patented Aug. 24, 1886.
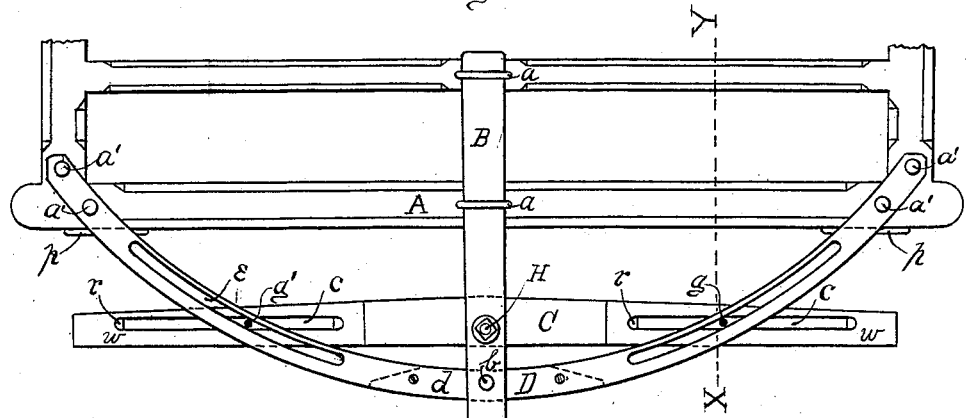
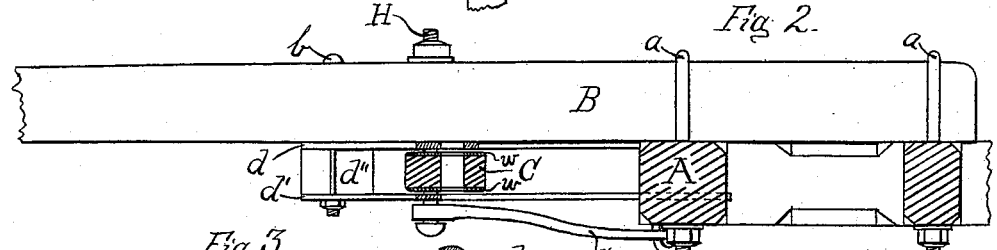
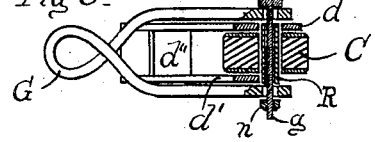
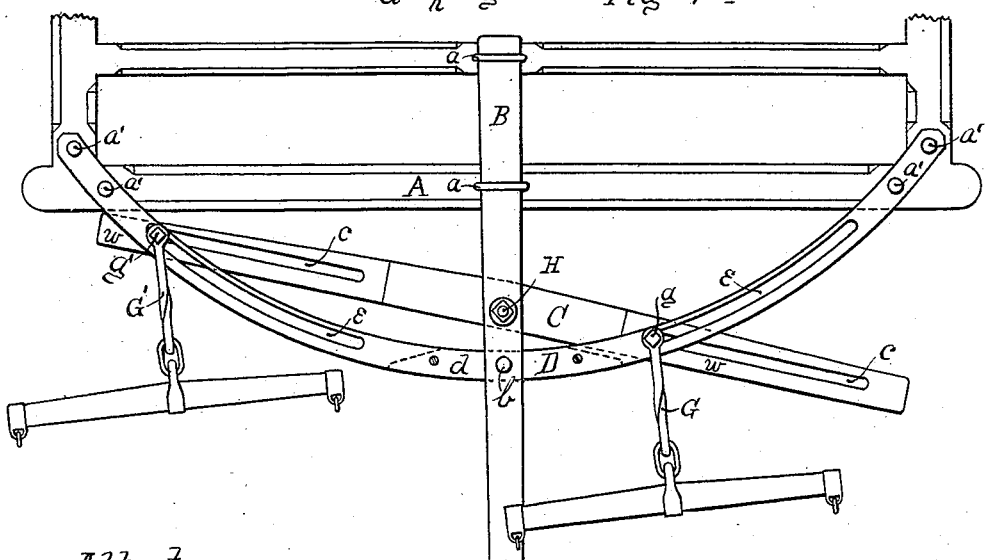
Attest
W. C. Sauzy
Wm. P. Jones
Inventor
Edwin R. Procter

UNITED STATES PATENT OFFICE.

EDWIN R. PROCTER, OF WASHINGTON COURT-HOUSE, OHIO.

DOUBLE-TREE.

SPECIFICATION forming part of Letters Patent No. 347,826, dated August 24, 1886.

Application filed May 5, 1886. Serial No. 201,372. (No model.)

*To all whom it may concern:*

Be it known that I, EDWIN R. PROCTER, of Washington Court-House, Ohio, have invented new and useful Improvements in Double-Trees, of which the following is a specification.

My improved double-tree has for its objects, first, to provide means in a double-tree for a two-horse seeding-machine or other vehicle of driving straight, notwithstanding the team in use may incline to pull unevenly; second, to provide means in a double-tree of putting the strongest-pulling horse at a disadvantage— to wit: to provide a device by which a pulling horse, when pulling ahead of his mate, instead of thus throwing increased work on said mate really gives said mate the advantage of the pull, while at the same time the pulling horse does not by his pulling ahead throw the tongue out of the desired straightway line of draft to the same extent as he would with the customary devices, in which the single-trees attach to or are confined at or near the ends of double-tree.

In the accompanying drawings, Figure 1 represents the plan of my device as attached to the front of a seeding-machine with the double-tree shown in the position it occupies when the horses pull evenly. Fig. 2 represents a side view of tongue with a section through front of frame, and also through the runway and double-tree on the line X Y. Fig. 3 represents a section taken on same line X Y through the double-tree, the clevis and pin being in position, the latter engaging the ends of clevis, the runway, and the slot of double-tree. Fig. 4 represents the device with the double-tree in the position it takes when the near or lead horse pulls ahead.

In the drawings, A represents the front of vehicle-frame to which the tongue B is fastened by the clips $a\ a$, and to which the ends of runway or guide D are fastened by the bolts $a'\ a'\ a'\ a'$.

C represents the slotted double-tree pivotally connected to tongue B by the wagon-hammer H, which has a strap, S, to hold its free end, said strap being attached in any customary manner to either the tongue or frame, as desired. The double-tree C, having the slots $c\ c$ through it to receive the pins $g\ g'$ of the clevises G G', respectively, has its ends covered on both sides with wear-plates $w$ where they move between the bars $d$ and $d'$ of the runway or guide D, the latter, D, being fastened in the center to the tongue B by the bolt $b$, passing through the said tongue, the bars $d$ and $d'$, and interposed block $d''$, and having the slots $e\ e$ in the upper bar, $d$, to receive and to assist in guiding the clevis-pins $g$ and $g'$, without which guidance of the bar $d$, with that of the plain bar $d'$, the said pins $g$ and $g'$ would be pulled toward the extremities of the double-tree whenever their respective sides were pulled the hardest.

R represents a cylindrical friction roller or sleeve inclosing the clevis-pins at that portion of same which would otherwise come in direct contact with runway-bars and double-tree. Two rollers, one above and one below the main roller R, may be used upon the clevis-pins in addition to said main roller, or the main roller may be prolonged to the length of the combined thicknesses of the ends of clevis, runway, and double-tree without deviating from my invention. In the ends of the slots $c\ c$ of double-tree, buffers $r$, of india-rubber or other suitable material, may be secured to deaden the occasional sudden contact of the clevis-pins. Striking plates or buffers $p$ may be attached to the front of frame to meet blows from the ends of double-tree.

It will be observed that in my device, when the stronger-pulling horse has pulled the device into the shape shown in Fig. 4, that on account of the clevis-pin of his single-tree sliding toward the center of tongue, thus shortening the leverage, he has his work increased, while the simultaneous sliding of his mate's single-tree away from center of tongue by lengthening the leverage diminishes the work of said mate. It will be observed also that when said device is in the shape shown in Fig. 4 that the stronger-pulling horse does not have the same power to force the tongue over against his mate (and thus throw the vehicle out of line) that he would have if the single-tree attachment were confined at or near the end of double-tree, as in some devices, since in my device the sliding of the stronger-pulling horse's single-tree toward the center of tongue lessens his leverage-power to crowd the tongue over. It will be observed also that from the fact of the arc of a circle described by runway being eccentric from the circle described by a given point on ends of slotted double-tree the said double-tree circle intersecting said arc, and the center of latter being behind the center of former, as to the draft, (the latter having the longer radius, and the former—i. e., double-tree—describing a shorter radius than that of runway or guide when revolving on the wagon-hammer,) that a given sliding clevis-pin, g, Fig. 1, approaches by pulling (the runway guiding it) the center of draft—i. e., the tongue—not so fast as the other of said pins g' recedes from the tongue, the result of which difference in speed is to encourage the weaker or backward horse to pull, and discourage, by an ever-increasing ratio of load, the stronger-pulling horse from over-exerting himself.

Although the drawings show the bar d' of runway D plain—i. e. unslotted—it may be made the duplicate of bar d, or both bars may be made plain, or both bars may be inclined at an angle from a point on tongue in front of wagon-hammer and from both sides of tongue back to front of frame or running-gears, instead of being a true arc of a circle, as shown, without departing from the scope of the invention. The runway and double-tree may be attached to tongue on top of same if so desired, or the runway or guide may be composed of a single bar, plain or slotted, and penetrating a suitable horizontal slot made in each ends of double-tree without deviating from my invention. In the latter or single-bar form of runway or guide the vertical slots in end of double-tree could be used to receive the clevis-pins, as in the form shown in drawings, or the clevis-pins could move behind both the double-tree and guide, the vertical slots in former being omitted; or, again, a double-tree having unslotted ends could be used with a runway or guide which was either plain or slotted, the clevis-pins moving behind both the double-tree and guide bar or bars without deviating from the invention.

When the device is attached to wagons or other vehicles—such as thrashing-machines, portable engines, &c.—the rear ends of runway bar or bars may be attached to a cross-bar, into which the tongue is framed at right angles, said cross-bar being hinged at each end to axle, or the rear ends of runway bar or bars may be attached directly to axle, to head-block, to hounds, or to circle-iron or other similar portion of front of the running-gears without deviating from the invention.

The device is more particularly designed for use on corn-planter, No. 333,547, Procter, January 5, 1886, straight driving being vital to the proper working of said corn-planter.

I am aware that draft equalizers have been made having clevis-pin guide-bars, one of which is attached to the rear of each end of said double-tree C, as shown in Fig. 1, (Fowler and Flagg, March 20, 1877, No. 188,618,) and two clevis-pins capable of separate adjustment, by hand within said guide-bars to a greater or less distance from the tongue, so that at the will of the driver one horse may at the start be given "less leverage in his favor than the other one." I therefore disclaim invention in such features, broadly or separately considered.

What I claim as new and useful is—

1. In a double-tree device, the clevis-pin guide bar or bars inclined from a point of attachment on the tongue in front of the wagon-hammer, and from both sides of tongue toward the front of the frame or the running-gears to which the rear ends of said bars are also attached, substantially as and for the purpose set forth.

2. As an improvement in double-trees, the combination of the clevis-pin guide-bars inclined from a point on the tongue in front of the wagon-hammer, and from both sides of tongue toward the front of the frame or the running-gears, to which the rear ends of said bars are attached, and a double-tree slotted at each end with single-tree-carrying clevises, substantially as and for the purpose set forth.

3. The combination, in a double-tree device, of a runway or guide, D, and a double-tree which is prolonged at each end beyond the points of intersection of said double-tree in its normal position—to wit, at right angles to tongue—with the said guides, with clevises whose pins slide in or on said double-trees, substantially as and for the purpose set forth.

4. As an improvement in double-trees having the runway or guide D intersecting the double-tree when latter is in its normal position—to wit, at right angles to tongue—at points equidistant from tongue on each side of latter, the combination, with the clevis-pins, of the rollers R, substantially as and for the purpose set forth.

5. As an improvement in double-trees, the combination of the tongue, the runway attached at its rear ends to front of frame or running-gears, and at its center to the tongue at a point in front of the wagon-hammer, the double-tree pivotally connected with tongue and lying within the runway as to its ends, the two clevises carrying the single-trees and overlapping the runway and the ends of double-tree moving therein, pivotally connected and sliding in or on the ends of said double-tree, substantially as and for the purpose set forth.

6. As an improvement in double-trees, the combination of the tongue B, the runway D, attached to frame A, and by the bolt b, attached to said tongue, the double-tree C, pivoted on the wagon-hammer H, behind said bolt b, the clevises G and G', having the pins g and g', respectively, said pins being guided by the said runway and engaging the ends of said double-tree, substantially as and for the purpose set forth.

7. As an improvement in double-trees, the combination of the tongue B, the runway D, attached to frame A by the bolts a', and by the bolt $b$, attached to said tongue, having the upper and lower guide-bars, $d$ and $d'$, respectively, the former having the slots $e$, the double-tree C, pivoted on the wagon-hammer H, having the slots $c$ and plates $w$, the clevises G and G', having the roller R, inclosed pins $g$ and $g'$, respectively, said pins being guided by and moving in the slots $e$ and slots $c$ of runway and double-tree, respectively, substantially as and for the purpose set forth.

In testimony of which invention I have hereunto set my hand.

EDWIN R. PROCTER.

Attest:
 W. C. TAUZEY,
 WM. P. JONES.